INVENTORS
FRANCIS PETER ALLES
WILLIAM RUSSELL SANER
BY John Ellsworth Griffiths
ATTORNEY

MAGNETIC RECORDING TAPE AND PROCESS OF MAKING SAME

Filed Sept. 20, 1956 2 Sheets-Sheet 2

INVENTORS
FRANCIS PETER ALLES
WILLIAM RUSSELL SANER

BY John Ellsworth Griffiths
ATTORNEY

United States Patent Office 3,009,847

Patented Nov. 21, 1961

3,009,847
MAGNETIC RECORDING TAPE AND PROCESS OF MAKING SAME

Francis Peter Alles, Westfield, and William Russell Saner, Scotch Plains, N.J., assignors to E. I. du Pont de Nemours and Company, Wilmington, Del., a corporation of Delaware Filed Sept. 20, 1956, Ser. No. 611,049
3 Claims. (Cl. 154—53.6)

This invention relates to magnetic recording tape having outstanding smoothness and output characteristics and to a process of making the same.

Magnetic recording tape is known to comprise magnetically susceptible particles dispersed throughout a non-magnetic binder, in the form of a thin layer which may be coated on supporting film or web.

It is generally known that one of the most important characteristics of a magnetic recording tape is that of surface smoothness of the magnetic layer. This is true in audio recording, where frequencies of 20 cycles per second to 15,000 cycles per second are recorded, and is even more true in video recording, wherein the tape must encompass not only the audio spectrum mentioned above but also the video spectrum which ranges up to frequencies of 4.5 megacycles per second.

Loss in output of a magnetic tape due to surface roughness or projections or particles on the magnetic surface may be calculated using the following formula:

$$\text{Loss in decibels (db)} = 55\left(\frac{d}{L}\right)$$

where $d$ is the separation in inches between the magnetic recording tape and the recording or playback head and L is the wave length of the recorded signal or $$L = \frac{\text{tape speed in inches per second}}{\text{recorded frequency in cycles per second}}$$

For example, in a typical situation in video recording the tape speed may be 1,500 inches per second and the recorded frequency 3,000,000 cycles per second. The wave length L is therefore equal to $$\frac{1,500}{3,000,000}$$

or .0005 inch. It will be seen that if the tape is separated from the recording or playback head by only .0001 inch, the loss in output will be $$\frac{.0001''}{.0005} \times 55$$

which equals 11 decibels (db). It is apparent that optimum output will result when the head to tape distance is a minimum, i.e., when the tape is free from surface irregularities such as roughness, projections, etc., which increase the separation distance.

It is general knowledge in the field of magnetic recording that it is desirable to produce magnetic recording tape having a smooth surface. Many methods are disclosed in the prior art for producing such surfaces. These prior art methods generally have attempted to improve the surface smoothness of magnetic tapes by procedures which involve an abrasive polishing or grinding action, e.g., by rubbing the magnetic surface with a burnisher, a buffing wheel or with the surface of another similarly rough magnetic tape, or which involve a compressive or compacting action, wherein surface irregularities and projections are partially leveled or eliminated by squeezing, e.g., by calendering or other application of pressure.

None of these prior art methods have proved to be entirely satisfactory.

It is therefore an object of the present invention to provide a novel process for making magnetic recording tape. Another object is to provide a process for making magnetic recording tape, the magnetic layer of which has a very smooth surface. Still another object is to provide such a process which results in a magnetic recording tape which has a superior output particularly at high frequencies. An additional object of one particular embodiment of this invention is to provide a process for making such tape which process overcomes the disadvantage of prior art processes using solvent type adhesives; such prior art processes are not practical when using a polyester support which is extremely impermeable to the solvents, and require an excessively long drying time. A further object is to provide such a magnetic recording tape having the properties described above which is in addition flexible, scratch resistant and durable.

The process of the invention is carried out by casting a thin layer of a magnetic material dispersed in a binder onto a highly polished casting surface moving at a uniform speed, coating one surface of a thin flexible support with an adhesive, or alternatively applying a thin layer of an adhesive to the layer of magnetic material, moving said support into adhesive contact with the magnetic layer to form a magnetic recording tape and subsequently stripping said tape from said casting surface.

The process of the invention will be readily understood by reference to the accompanying drawings which form a part of this application. Referring now to the drawings.

Figure 1:
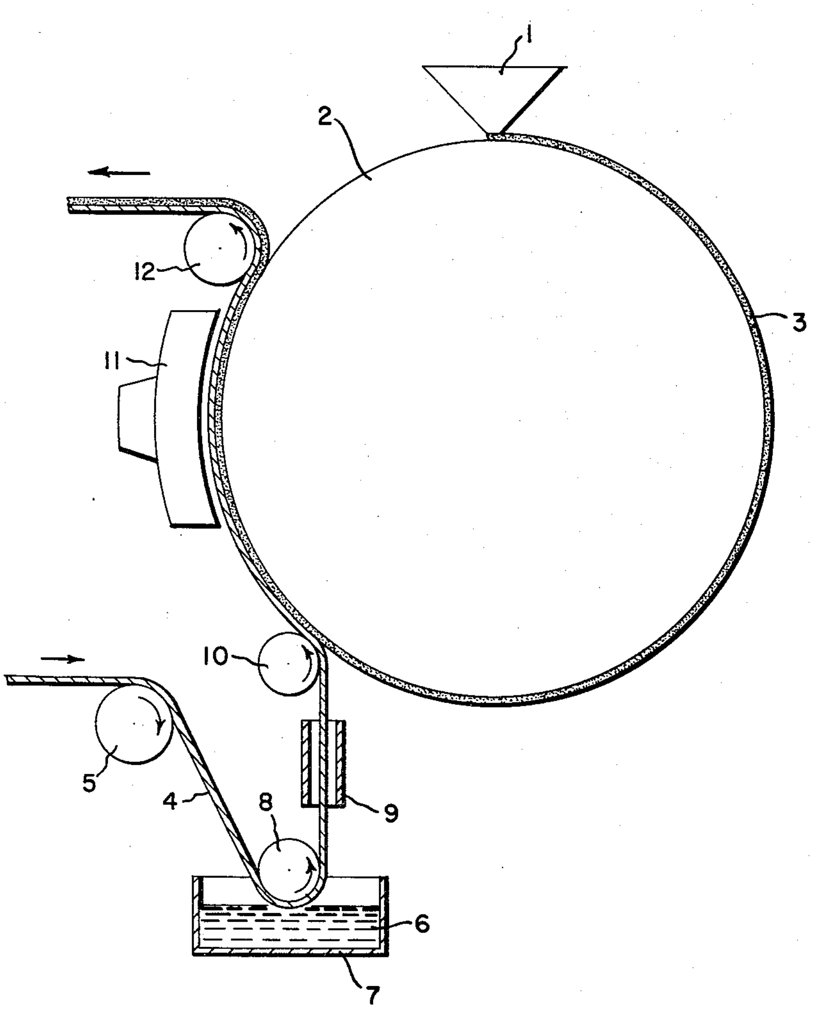
FIG. 1 is a schematic cross-section showing one process according to this invention, with the magnetic dispersion layer and support exaggeratedly enlarged for purposes of illustration.

Referring now to FIG. 1 of the drawings, from casting hopper 1 onto the highly polished casting surface of rotating casting wheel 2 is cast a thin layer 3 of a magnetic material dispersed in a suitable binder. Simultaneously, a thin flexible support 4 from a suitable source of supply passes over idler roller 5 and receives on one surface a thin application of adhesive 6 from coating pan 7 by a skim coating method as the support passes under coating roller 8. The adhesive coated support then passes through heater 9, the purpose of which will be described below. The support is then guided by roller 10 into adhesive contact with magnetic layer 3 to form the recording tape which moves past polymerization means 11 and which is subsequently stripped from the casting surface of wheel 2 after passing guide roller 12, from which point the tape may be suitable disposed of, as by wind-up.

Figure 2:
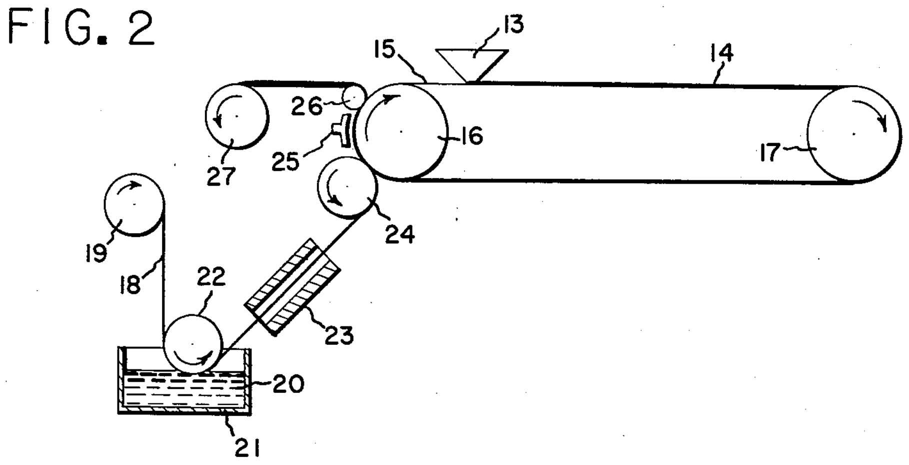
FIG. 2 is a schematic cross-section showing an alternate embodiment of the process of this invention.

In another embodiment of the process of this invention illustrated in FIG. 2, a dispersion of magnetic material is cast from casting hopper 13 in the form of a thin magnetic layer 14 onto the surface of highly polished belt 15 which is continuously moving over supporting rollers 16 and 17, at least one of which may be suitably driven. Simultaneously, a thin flexible support 18 from a suitable source of supply, as the unwind roller 19, receives on one surface a thin application of adhesive 20 from coating pan 21 by a skim coating method as the support passes under coating roller 22. The adhesive coated support then passes through heater 23, the purpose of which will be described below. The support is then guided by roller 24 into adhesive contact with magnetic layer 14 to form the recording tape which moves past polymerization means 25 and which is subsequently stripped from the casting surface of belt 15 at guide roller 26, from which point the tape may be led to wind-up roller 27 or other suitable disposition.

In either of the above mentioned embodiments, the adhesive referred to may be pressure-sensitive, in which case the heater and polymerization means are not used. The adhesive, however, may be of the thermoplastic type, in which case the application of heat from the heater or other equivalent means is necessary to render the adhesive tacky in order to effect a satisfactory bond between the support and the magnetic layer. When using a thermoplastic adhesive, it may be desirable to cool the adhesive after the tape has been formed to harden the bond and this may be done in any suitable way, e.g., circulating air, water, etc.

The adhesive may alternatively be of the polymerizable type, which specifically includes both photopolymerizable and thermopolymerizable materials. These polymerizable materials are low molecular weight compositions containing a photo-sensitive or thermo-sensitive catalyst, which initiates polymerization of the composition to a higher molecular weight solid upon exposure of the material to light or heat. When such polymerizable materials are used as the adhesive, the use of the heater illustrated in FIGS. 1 and 2 prior to the joining of the support and the magnetic layer is unnecessary. Polymerization of the polymerizable material is effected, preferably prior to the stripping of the tape from the casting surface, by the application of polymerizing means, e.g., ultraviolet light, heat, etc., to the tape.

Carrying out the above described process results in a magnetic recording tape according to this invention, which tape comprises a thin layer of a magnetically susceptible material dispersed in a binder, said layer having a surface smoothness in the range of 2.0 to 8.0 microinches (root mean square). Such a high degree of smoothness of the magnetic layer surface has heretofore been unattainable using prior art methods of magnetic tape manufacture.

Figure 3:
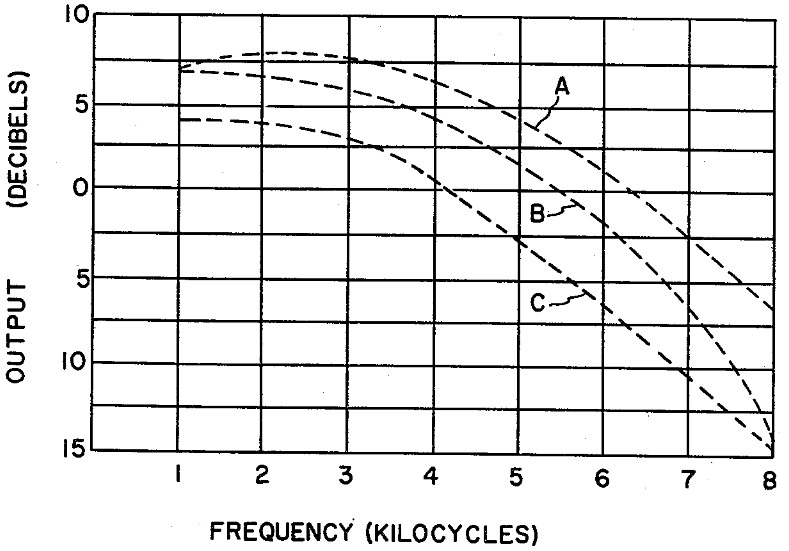
FIG. 3 is a graph illustrating the outstanding frequency response of the novel magnetic recording tape of this invention.

Referring again to the drawings, FIG. 3 illustrates the relative output expressed in decibels exhibited by a magnetic tape A made according to the process of this invention, a tape B coated with the same magnetic dispersion as tape A but coated by prior art methods which produces a mat or satin-like surface which is characteristic of most commercially available tapes, and a commercially available tape C selected from among those having the smoothest surface. The tapes were tested on an "Ampex Model 307" recorder over the frequency range of 1,000 to 80,000 cycles per second with equalization. The recorder was adjusted for each tape to obtain the optimum high frequency bias, and the input was adjusted at 1,000 cycles per second for an output having 1% third harmonic distortion. The recorder was operated at a tape speed of 30 inches per second relative to the recording and playback heads. Curve A illustrates the output exhibited by the tape produced according to the process of this invention. Curve C illustrates the output exhibited by a commercially available tape, and curve B illustrates a tape having the same magnetic dispersion as the tape of curve A but coated by a conventional prior art method. It can be seen that the magnetic tape A, having a surface smoothness obtained according to this invention, exhibits a marked improvement in frequency response when compared with the prior art tapes B and C and that this improvement becomes increasingly greater as the frequency rises.

The present invention will be further illustrated and explained but it is not intended to be limited by the following examples in which the surface smoothness is measured by a Zeiss interference microscope:

*Example I*

The following ingredients are mixed by ball milling for 72 hours:

70.0 grams magnetic $Fe_2O_3$;

0.7 gram stearic acid;
0.7 gram dioctyl ester of sulfosuccinic acid;
100.0 ml. tertiary butanol;
100.0 ml. toluene; and
27.0 grams of a 20% solution of polyvinyl butyral in tertiary butanol and toluene (1:1).

Sixty grams additional polyvinyl butyral solution are added and the ball milling continued for 24 hours. The resultant dispersion is filtered and cast onto a highly polished chromium plated brass plate which has a surface smoothness of 3 microinches (root mean square). A doctor blade is used to obtain a layer thickness of .0005 inch (measured when dry). A thin narrow film of a polyethylene terephthalate .001 inch thick is coated with a layer of the polyvinyl butyral solution measuring .0003 inch when dry. The coated side of the polyethylene terephthalate film after some drying is guided into contact with the magnetic dispersion layer to form a composite tape structure. The tape is then heated to 120° C. and the tape structure is stripped from the plate. The magnetic layer surface has a smoothness of 6 microinches (root mean square), the adhesion of the magnetic layer to the supporting film is excellent and the recording characteristics are superior to tapes made with the same oxide dispersion and coated by prior art methods to give a mat surface, which is characteristic of prior art tapes.

*Example II*

Example I is repeated except that the .0003 inch thick adhesive layer of polyvinyl butyral is replaced with a layer of similar thickness using a 25% solution in toluene of a chlorosulfonated polyethylene containing approximately 27.3% chlorine and 1.5% sulfur wherein most of the chlorine is substituted along the hydrocarbon chain and sulfur is combined with chlorine and attached to the carbon chain as sulfonyl chloride ($SO_2Cl$). The resultant magnetic tape exhibits a surface smoothness of 6 microinches (root mean square), and has substantially the same qualities as the tape of the preceding example.

*Example III*

Example I is repeated except that the magnetic dispersion is cast from a hopper of the type described in Velvel U.S. application Serial No. 489,868, filed February 23, 1955, now U.S. Patent 2,765,492 issued October 9, 1956, onto a moving superfinished endless belt of the type illustrated in FIG. 2 having a surface smoothness of 2 microinches (root mean square). The polyethylene terephthalate film is coated with an adhesive comprising a solvent-soluble polyester made by an ester interchange reaction between ethylene glycol and a mixture of terephthalic acid and sebacic acid (1:1). The resultant magnetic tape exhibits a surface smoothness of 4 microinches (root mean square) and has the same excellent qualities of the tapes of the preceding examples.

*Example IX*

Example III is repeated except that the adhesive used is an aqueous dispersion of a copolymer of 80 parts by weight vinylidene chloride and 20 parts by weight of acryonitrile, with 20% dibutyl phthalate plasticizer. The resultant magnetic tape exhibits a surface smoothness of 4 microinches (root mean square) and has the same excellent qualities of the tapes of the preceding examples.

*Example V*

Example I is repeated except that the adhesive used is an aqueous dispersion of a terpolymer of 80 parts by weight of vinylidene chloride, 20 parts by weight of butyl acrylate, and 2 parts by weight of itaconic acid. The magnetic dispersion is cast onto a superfinished casting wheel of the type illustrated in FIG. 1. The resultant magnetic tape exhibits a surface smoothness of 3 microinches (root mean square) and has the same excellent qualities of the tapes of the preceding examples.

*Example VI*

Example III is repeated except the polyethylene terephthalate film is coated with the pressure-sensitive adhesive described in Drew U.S. Patent No. 2,177,627, Example C. The resultant magnetic tape exhibits a surface smoothness of 4 microinches (root mean square) and has the same excellent qualities of the tapes of the preceding examples.

*Example VII*

Example I is repeated except that the adhesive is a "Epon" resin having the formula:

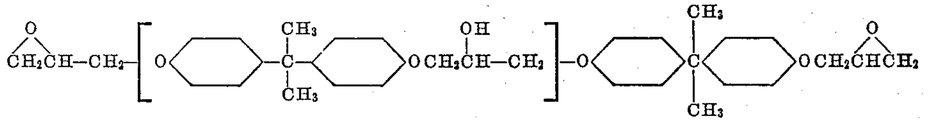

which is sold by the Shell Chemical Company. The "Epon" resin is further characterized by having a melting point of 75° C. and contains 1 gram equivalent of epoxide per 500 grams of resin. The resultant magnetic tape exhibits a surface smoothness of 6 microinches (root mean square) and has the same excellent qualities of the tapes of the preceding examples.

*Example VIII*

Example I is repeated except that the adhesive used is a photopolymerizable methylmethacrylate containing from 0.01% to 1.0% by weight benzoin. The apparatus used is of the type illustrated in FIG. 1 and the tape is irradiated by ultraviolet light as the polymerizing means as described in Christ U.S. Patent No. 2,367,670. The resultant magnetic tape exhibits a surface smoothness of 6 microinches (root mean square) and has the same excellent qualities of the tapes of the preceding examples.

*Example IX*

Example I is repeated except that the adhesive is a .0002" (dry thickness) layer of a 50:50 composition of triethylene glycol diacrylate and monomeric vinyl acetate containing 0.1% by weight benzoin methyl ether. The apparatus used is of the type illustrated in FIG. 2 and the tape is exposed to irradiation from a 2,000 watt high pressure mercury lamp for a period of 30 seconds as a polymerizing means, during which exposure the monomers are converted to polymeric adhesives. The resultant magnetic tape exhibits a surface smoothness of 6 microinches (root mean square) and has the same excellent qualities of the tapes of the preceding examples.

*Example X*

Examples I, III and V are repeated except that a mineral oil is added to the magnetic dispersion as a stripping aid. The mineral oil has a viscosity of 2134 Standard Sebold Units at 100° F., a gravity (American Petroleum Institute) of 26.5, and is added in an amount equal to 0.75% of the total weight of the dispersion. The resultant magnetic tapes exhibit surface smoothness in the range of 2 to 8 microinches (root mean square) and have the same excellent qualities of the tapes of the preceding examples.

When using certain binders, it may be desirable to precoat the polyester film to improve the adhesion of the magnetic coating to the base. The methods described in Alles et al. U.S. 2,627,088 and U.S. 2,698,239, and Saner U.S. 2,698,241 and U.S. 2,698,242 and particularly useful.

The magnetic material, i.e., magnetically susceptible material, is not especially critical and can readily be selected by persons skilled in the art. Suitable materials include ferromagnetic $Fe_2O_3$, $Fe_3O_4$, and $CrO_2$, which are described in Arthur U.S. application Serial No. 515,521, filed June 14, 1955, now abandoned, and Swoboda U.S. application Serial No. 515,523, filed June 14, 1955, now abandoned, U.S. Patent No, 2,694,656, and ilmenite type ferromagnetic manganese complexes as described in Toole U.S. application Serial No. 452,449, filed August 26, 1954, now Patent No. 2,770,523.

Suitable binding materials utilizable in this invention include polymeric materials, e.g., a cellulose derivative such as cellulose acetate, cellulose nitrate, cellulose acetate propionate; and synthetic resin or super polymer, e.g., a polymethyl methacrylate/phenolformaldehyde condensation product, polystyrene, nylon, vinylidene chloride copolymers with ethylenically unsaturated monomers, e.g., vinyl chloride, vinyl acetate, isobutylene, acrylonitrile, etc. The binding materials can be used as fluids or as solutions in suitable organic solvents. The preferred binder material is polyvinyl butyral as described in Example I above.

The binder may also contain dispersing agents, e.g., tetraisopropyl titanate dioctyl ester of sodium sulfosuccinic acid and mixtures of the latter with stearic acid. The binder may also contain plasticizers, lubricants, stripping aids and other additives. For convenience, to assist a user in readily distinguishing between the magnetically active surface of the tape and the support side of the tape, a suitable dye or pigment may be added to one or more of the layers of the tape.

The flexible support utilizable in this invention may be paper or a polymeric film which may consist of such well known film-forming materials as cellulose derivatives, e.g., cellulose nitrate, cellulose triacetate, cellulose propionate, cellulose acetate butyrate; polyvinyl chloride, polyvinyl chloride/acetate; polyvinyl acetals, e.g., from formaldehyde and acetaldehyde; super polyesters from dicarboxylic acids and dihydric alcohols, e.g., oriented sheets of polyethylene terephthalates having melting points above 200° C. The latter is the preferred support material because of its strength, stability and other desirable physical properties.

The very smooth highly polished casting surface utilized in the process of this invention may be formed using known finishing methods and apparatus, e.g., of the type disclosed in U.S. Patents Nos. 2,612,736, 2,655,769, 2,655,772, 2,655,775 and 2,697,900.

An outstanding advantage of this invention lies in the fact that magnetic tapes of uniform properties are obtained. In magnetic recording, particularly in recording the high frequencies encountered in video work, the novel tape of this invention, because of its exceedingly smooth surface, has the advantage of giving excellent reproduction and output at the higher frequency levels. In addition, the magnetic tape having the improved surface smoothness reduces the abrasive action of the magnetic coating on the recording and playback heads.

Another advantage of this invention is that the absence of bumps or particles projecting from the working surface of the tape eliminates "drop outs" (skips in recording) caused by the projections lifting the tape momentarily from the recording and playback heads. The process of this invention has the still further advantage of enabling the production of magnetic recording tape while eliminating the costly process of buffing or burnishing the tape. A particular advantage of one embodiment of the process of this invention is that excessively long drying times for adhesives are not required. Still other advantages will be apparent from the above description of the invention.

The invention claimed is:

1. The process of making magnetic recording tape which comprises casting a thin layer of a magnetic material dispersed in a binder onto a moving smooth casting surface, coating one surface of a thin flexible polyethylene terephthalate support with an addition polymerizable adhesive composition containing at least one monomeric compound having at least one ethylenically unsaturated group selected from the group consisting of acrylate and alkacrylate groups, guiding said support into contact with the magnetic layer, the polymerizable adhesive coating being adjacent to said magnetic layer, effecting addition polymerization of said polymerizable adhesive while the coating and layer are in contact to form an adhesive bond and a composite magnetic recording tape and subsequently stripping said composite magnetic tape from said casting surface.

2. A process as defined in claim 1 wherein said addition polymerizable adhesive composition is photopolymerizable.

3. A magnetic recording tape comprising a thin flexible polyethylene terephthalate support bearing a thin adhesive layer composed of an addition polymer from a polymerizable composition containing at least one monomeric compound having at least one ethylenically unsaturated group taken from the group consisting of acrylate and alkacrylate groups and in contact with said adhesive layer a thin layer of a magnetically susceptible material dispersed in a polyvinyl butyral binder, said magnetic layer having a surface smoothness of 2 to 8 microinches (root mean square).

References Cited in the file of this patent

UNITED STATES PATENTS

| | | |
|---|---|---|
| 934,601 | Fuller | Sept. 21, 1909 |
| 1,847,860 | Best | Mar. 1, 1932 |
| 2,548,872 | Cross et al. | Apr. 17, 1951 |
| 2,567,186 | Cross et al. | Sept. 11, 1951 |
| 2,587,594 | Chavannes et al. | Mar. 4, 1952 |
| 2,594,893 | Faus | Apr. 29, 1952 |
| 2,628,929 | Persoon et al. | Feb. 17, 1953 |
| 2,739,919 | Artzt | Mar. 27, 1956 |
| 2,774,327 | Saint-Hilaire | Dec. 18, 1956 |
| 2,799,609 | Dalton | July 16, 1957 |
| 2,804,401 | Cousino | Aug. 27, 1957 |
| 2,819,186 | Franck | Jan. 7, 1958 |

FOREIGN PATENTS

| | | |
|---|---|---|
| 459,884 | Great Britain | Jan. 18, 1937 |